United States Patent
Sharma et al.

(10) Patent No.: US 7,162,470 B2
(45) Date of Patent: Jan. 9, 2007

(54) CONTEXTUAL SEARCH INTERFACE FOR BUSINESS DIRECTORY SERVICES

(75) Inventors: Jayant Sharma, Nashua, NH (US); Ping Wang, Stanford, CA (US); Liujian Qian, Lancaster, MA (US); Ji Yang, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 398 days.

(21) Appl. No.: 10/457,830

(22) Filed: Jun. 9, 2003

(65) Prior Publication Data

US 2004/0054691 A1 Mar. 18, 2004

Related U.S. Application Data

(60) Provisional application No. 60/387,295, filed on Jun. 7, 2002.

(51) Int. Cl.
*G06F 17/00* (2006.01)
*G06F 17/30* (2006.01)

(52) U.S. Cl. .................. 707/3; 707/1; 707/5
(58) Field of Classification Search ............ 707/1, 707/3
See application file for complete search history.

(56) References Cited

U.S. PATENT DOCUMENTS

| 6,510,434 | B1 * | 1/2003 | Anderson et al. ........... 707/100 |
| 2003/0050924 | A1 * | 3/2003 | Faybishenko et al. ......... 707/3 |
| 2004/0171379 | A1 * | 9/2004 | Cabrera et al. .......... 455/422.1 |
| 2004/0204958 | A1 * | 10/2004 | Perkins et al. ................. 705/1 |
| 2005/0273469 | A1 * | 12/2005 | Monberg et al. ........... 707/100 |

* cited by examiner

*Primary Examiner*—Alford W. Kindred
(74) *Attorney, Agent, or Firm*—Chapin IP Law, LLC; Barry W. Chapin, Esq.

(57) ABSTRACT

Business directory services allow definitions of custom category hierarchies and different search methods, such as, for example, search by location, distance from an addressable location, partial or complete business name, and category. A stepwise refinement search interface provides capability for searching within search results using different search methods or categories. Thus, a user does not have to refine and re-enter search criteria in order to get a progressively selective search. This is particularly useful for mobile phone or hand-held device users who would prefer not to have to re-enter the criteria on each search but rather incrementally refine the search criteria.

27 Claims, 12 Drawing Sheets

A sample listing lookup YP request is shown below.

```
<YP_request data_provider="infousa" type="listing_lookup">
    <listing_lookup result_type="basic" number_to_return="20">
        <category code list="123456;23456" />
        <listing_name
            search_string="BURGER KING"
            search_mode="start_with"
        />
        <search_reqion>
            <input_location>
                <input_address>
                    <us_form2 postal_code:."03062" />
                </input_address:.
            </input_locations
        </search_region>
    </listing_lookup>
</YP_request>
```

Numbered callouts: 510, 512, 514, 516, 518.

FIG. 5A

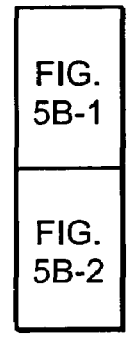

FIG. 5B

Input DTD

```
< |ELEMENT YP_request (listing_lookup | category_lookup |
category_browse)>
< |ATTLIST YP_request
   data_provider CDATA #IMPLIED
   country CDATA #IMPLIED
   type (listing_lookup | category_lookup | category_browse)
#REQUIRED
>
< |ELEMENT listing_lookup (category?, listing_name?,
search_region?)>
< |ATTLIST listing_lookup
   result_type (basic | detail | detail2 | detail3) #REQUIRED
   number_to_return CDATA #REQUIRED
>
< |ELEMENT category_lookup EMPTY>
< |ATTLIST category_lookup
   search_string CDATA #REQUIRED
   search_mode (equal | contain | start_with | contain_all |
contain_any | sound_like) #REQUIRED
>
```

FIG. 5B-1

```
<!ELEMENT category_browse EMPTY>
<!ATTLIST category_browse
  browse_type (root_nodes | all_children | direct_children |
ancestors | siblings) #REQUIRED
  starting_node_id CDATA #IMPLIED
>
<!ELEMENT category EMPTY>
<!ATTLIST category
  code_list CDATA #IMPLIED
  search_string CDATA #IMPLIED
  search_mode (equal | contain | start_with | contain_all |
contain_any | sound_like) #REQUIRED
>
<!ELEMENT listing_name EMPTY>
<!ATTLIST listing_name
  search_string CDATA #REQUIRED
  search_mode (equal | contain | start_with | contain_all |
contain_any | sound_like) #REQUIRED
>
<!ELEMENT search_region (input_location)>
<!ATTLIST search_region radius_ CDATA #IMPLIED
  "nearest_" CDATA #IMPLIED
>
<!ELEMENT input_location (point | linestring | input_address)>
<!ELEMENT point EMPTY>
<!ATTLIST point
  eroName CDATA #REQUIRED
>
<!ELEMENT linestring EMPTY>
<!ATTLIST linestring
  eroName CDATA #REQUIRED
>
<!ELEMENT input_address >
```

FIG. 5B-2

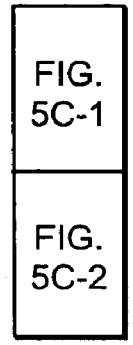

FIG. 5C

```
<|ELEMENT yp_response (category_list | listing_list |
geocode_result)>
<|ATTLIST yp_response
  type (category_list ê listing_list) #REQUIRED
  error_message CDATA #IMPLIED
>
<|ELEMENT geocode_result (location)>
<|ELEMENT category_list (category+)>
<|ELEMENT listing_list (listings)>
<|ATTLIST listing_list
  number_of_return CDATA #REQUIRED
  result_type (basic 1 detail 1 detail2) #REQUIRED
>
<|ELEMENT category (category+)>
<|ATTLIST category
  name CDATA #REQUIRED
  id CDATA #IMPLIED
  category_code CDATA #REQUIRED
  parent_id CDATA #REQUIRED
  level CDATA #IMPLIED
>
```

FIG. 5C-1

```
< |ELEMENT listing (category, location) >
< |ATTLIST listing
  name CDATA #REQUIRED
  telephone CDATA #REQUIRED
  fax CDATA #REQUIRED
  category_code CDATA #REQUIRED
  website CDATA #IMPLIED
  stock_symbol CDATA #IMPLIED
>
< |ELEMENT location (output_address)>
< |ATTLIST location
  longitude CDATA #REQUIRED
  latitude CDATA #REQUIRED
>
< |ELEMENT output_address EMPTY>
< |ATTLIST output_address
  street CDATA #REQUIRED sub_area CDATA #REQUIRED
builtup_area CDATA #REQUIRED
order1_are: CDATA #REQUIRED
postal_code CDATA #REQUIRED
postal_addon_code CDATA #REQUIRED
house_number CDATA #REQUIRED
country CDATA #REQUIRED
>
```

FIG. 5C-2

| COLUMN_NAME | TYPE | PURPOSE |
|---|---|---|
| VENDOR | VARCHAR2(30) | Name of the data vendor (e.g. INFOUSA) |
| VENDOR_CODE_2 | VARCHAR2(2) | 2 letter ISO country code of the country to which the data belong to (e.g. US) |
| CATEGORY_TABLE | VARCHAR2(30) | Name of the category table for this vendor/country (e.g. CATEGORY_INFOUSA) |
| LISTING_TABLE | VARCHAR2(30) | Name of the listing table for this vendor/country (e.g. LISTING_INFOUSA) |

FIG. 6A

| COLUMN_NAME | TYPE | PURPOSE |
|---|---|---|
| ID | NUMBER | Unique identifier |
| CATEGORY | VARCHAR2(100) | Category Name |
| SIC | VARCHAR2(16) | Standard Industrial Classification code |
| PARENT_ID | NUMBER | ID of parent of this category |

FIG. 6C

| COLUMN_NAME | TYPE | PURPOSE |
|---|---|---|
| ID | NUMBER | Unique identifier |
| COMPANY_NAME | VARCHAR2(30) | Company name |
| ADDRESS | VARCHAR2(30) | Street address (e.g. 1 Oracle Drive) |
| SUB_AREA | VARCHAR2(20) | Name of sub area inside a city in which the company HQ is located |
| CITY | VARCHAR2(20) | City in which the company HQ is located |
| REGION | VARCHAR2(20) | Region in which the company HQ is located. (e.g. this column stores the state names for US listings) |
| POSTAL_CODE | VARCHAR2(6) | Postal code |
| POSTAL_ADDON-CODE | VARCHAR2(6) | Postal code extension |
| PHONE | VARCHAR2(12) | Phone number |
| FAX_PHONE | VARCHAR2(12) | Fax number |
| SELECTED_SIC_CODE | VARCHAR2(6) | Assigned SIC code |
| OSOM | SDO_GEOMETRY | Location of company HQ in Latitude/Longitude |
| COUNTRY_CODE_2 | VARCHAR2(3) | 2 letter ISO country code |

FIG. 6B

CONTEXTUAL SEARCH INTERFACE FOR BUSINESS DIRECTORY SERVICES

RELATED APPLICATION(S)

This application claims the benefit of U.S. Provisional Application No. 60/387,295, filed on Jun. 7, 2002.

The entire teachings of the above application are incorporated herein by reference.

BACKGROUND

Business directory services provide users with lists or names of businesses in a specified category or location. A user can request a business of a particular type in a particular city and receive a listing of all available businesses of that type. Such services are sometimes referred to as Yellow Page services. Existing directory services have different interfaces and functionality: some allow searching by partial or exact business name, within a city, or by category, or a combination of the three. A smaller set of service providers allow searching by name and category within a specified distance from an addressable location. An addressable location is a uniquely identified geographical point such as, for example, a street address or a uniquely identified point of interest, or named administrative areas such as cities or postal codes.

There are several standard nomenclatures for categorization and classification of businesses. Examples of such standards are the Standard Industrial Classification (SIC) codes, the North American Industrial Classification System (NAICS), which replaces the SIC system, and Universal Standard Products and Services Classification created by the Electronic Commerce Code Management Association (EC-CMA). In addition, some directory service providers create custom nomenclatures and protocols.

Business directory services are accessed by users from computers or other electronic access devices, such as, for example, cellular phones enabled for web browsing. If not satisfied with results of the first query, a user can submit another query, supplying original parameters as well as additional restrictions. This narrowing of search, referred to as "drilling down," is typically limited to the original category or subcategory. For example, if the user is looking for a car dealership within a certain distance of a given location, in a process of drilling down, the user may be able to narrow the allowed distance but not add additional markers or specifications for the search.

SUMMARY

Particular embodiments of the invention can include business directory services that allow definitions of custom category hierarchies and different search methods, such as, for example, search by location, distance from an addressable location, partial or complete business name, and category. A stepwise refinement search interface can provide a capability for searching within search results using different search methods or categories. Thus, a user does not have to refine and re-enter search criteria in order to get a progressively selective search. This is particularly useful for users of wireless devices, such as mobile phone or hand-held devices, when users may prefer not to have to re-enter the criteria on each search, but rather incrementally refine the search criteria.

Additional functionality can allow customers to browse business categories and drill down a search from a simple cell phone interface, where entering a lot of text at the same time is not practical. A context object can be used to represent search criteria at any given time. The context object can meet the requirements listed above by, for example, allowing users to specify partial search criteria at any given time. With the narrowed result set returned, the user can continue to specify more criteria and search within the results until the final page entry is located.

Aspects of the invention include methods for providing business directory services to users. A user can enter query parameters into a client. The search parameters can be stored in a context object and passed to the business directory server, which process the requests and returns search results to the client. Once the search results are presented to the user, the user can decide to revise the query by drilling down into particular listings or categories. Additional search parameters can then be added to the context object and can be passed back to the business directory server for processing. Searching can proceed in such iterations until the desired level of result granularity is achieved.

Search parameters can include type of the search to be performed: whether it is to find a listing, browse listings, or browse by category. Within each type, there may be additional limitations. In addition, user can specify search parameters based on a particular geographic object (for example, an address, or a uniquely defined geographic location).

If the user is accessing the business directory services from a wireless device, the results can be presented in such a way as to make it easy for the user to browse them and to enter additional search parameters.

The business directory services system can consist of a dispatcher module, which receives requests from the client, a business directory server module, which processes the requests and sends database queries to a database. The business directory server module also processes database results, converts them to a pre-defined XML schema and sends them back to the client through the dispatcher module.

BRIEF DESCRIPTION OF THE DRAWINGS

The foregoing and other objects, features and advantages of the contextual search interface for business directory services will be apparent from the following more particular description of particular embodiments of the invention, as illustrated in the accompanying drawings in which like reference characters refer to the same parts throughout the different views. The drawings are not necessarily to scale, emphasis instead being placed upon illustrating the principles of the invention.

FIGS. 5a–c illustrate XML schema for requests and responses between clients and the business directory server;

FIGS. 6a–c illustrate database schema for a business directory database;

DETAILED DESCRIPTION

The use of business directory services is greatly improved with additional functionality that allows users to refine and improve search criteria based on the received search results and additional categories. For example, if a user wants to find a Mercedes-Benz dealer around the Boston area, the user can specify "automobile dealers" as a high level category. The business directory service engine might then return a list of several categories, from which the user can select "new car dealers." A list of car brands will be presented next, with the context "automobile/new car dealers" as a business category. Then the user can select "Mercedes-Benz" followed by the location, for example, Boston, Mass., as the location criteria. During each query step, an object containing context, that is, the business category hierarchy and the location hierarchy (or simply location information) is recorded and passed on to the following inquiries.

Implemented in a particular embodiment of the invention are various search features, such as looking up a business listing by a combination of name, category and location. For example, one may look at a listing of a business names "Pizzico" in the category "restaurants" (or eating and drinking places) and in Nashua, N.H. In addition specific business or home locations can be looked up or browsed by the category hierarchy. Additional search features can be supported such as, for example, searching by names of individuals (instead of businesses) or searching using custom hierarchies.

Various string match modes and a business or category name look-ups can be supported. The modes are: "exact," "starts with," "contains," and "sounds like." In addition, searches like "nearest neighbor" and "within distance" are supported when a location is specified. That is, the user can run a search for a business within a specified category or a specific business that is within a specified distance from or nearest to a given location. The location can be described as a place name, street address, postal code or geographic objects.

Data for the business directory service can be provided by multiple providers, each using its own data format. Different data formats can be accommodated as described below in connection with FIG. 6, and multiple data providers' classification schemes or category hierarchies can be supported within one business directory service implementation.

As used herein, "business directory service" refers not only to services allowing users to search for various businesses, but also to a more generalized search service, allowing users to search for addresses, locations defined by description, businesses or any other geographical object. A particular business directory service is implemented using Standard Industrial Classification (SIC) codes, however, an alternative embodiment of the invention can use any other standard or custom categorization nomenclature.

Figure 1:
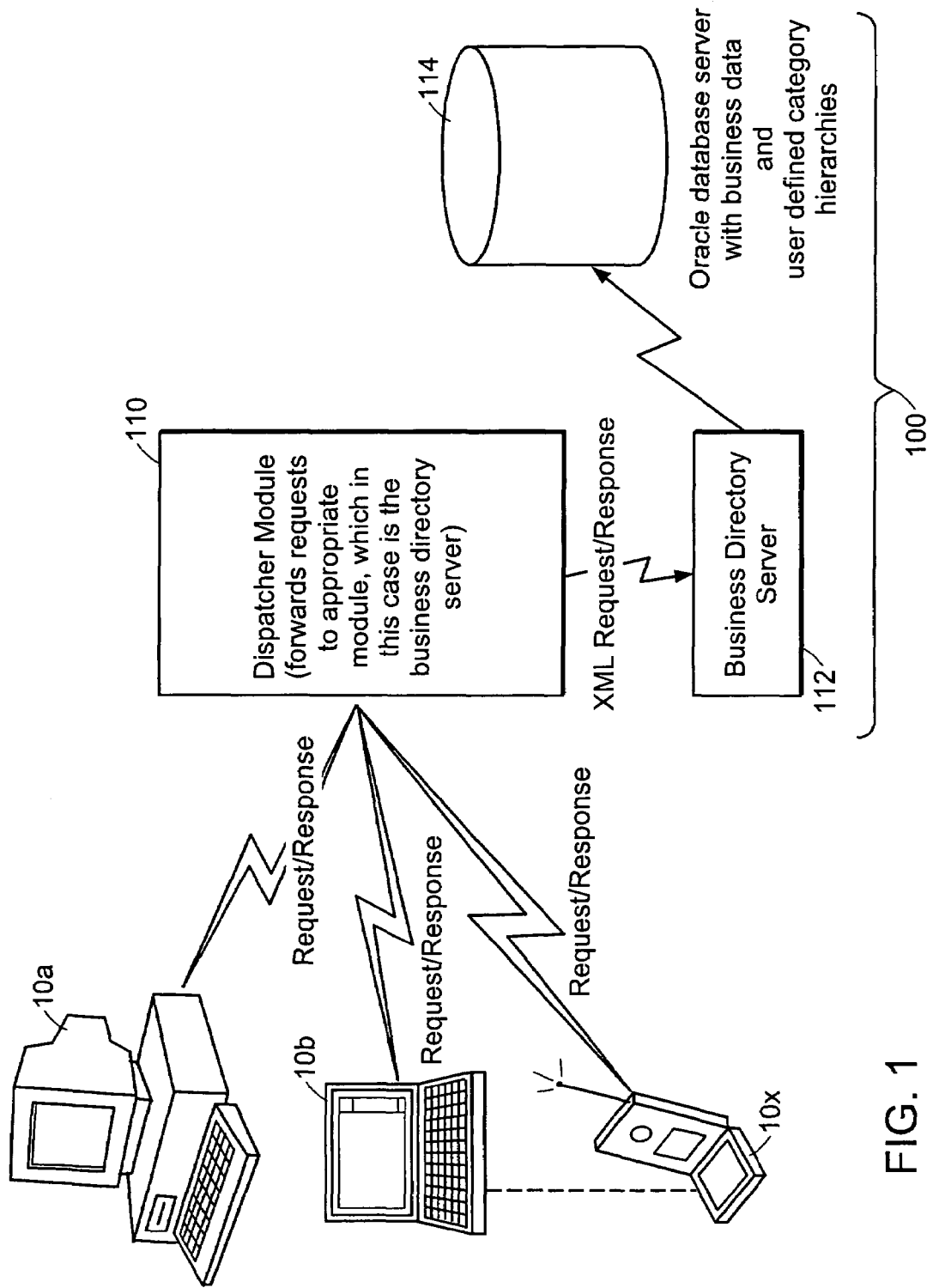
FIG. 1 is a schematic diagram of the business directory service architecture according to one embodiment of the invention.

Referring now to FIG. 1, there is shown a schematic representation of a general architecture of the business directory service according to one embodiment of the invention. The business directory service 100 is implemented as a multi-tier system. Clients 10a–x access the system 100 using networked clients using communication protocols such as known in the art. Networked clients 10a–x can be running on personal computers, mobile phones, hand-held devices, or any other devices capable of being connected to a network.

The system 100 consists of a dispatcher module 110, which receives requests from clients and performs initial processing. The dispatcher module 110 is connected to a business directory server 112. The business directory server 112, in turn, interacts with a database server 114 in order to fulfill clients' requests. The database server 114 can contain business data and user-defined category hierarchies. The data contained in the database server 114 can come from different data providers, and be formatted in different ways, depending on the type of information contained in a particular subset of data.

Figure 2:
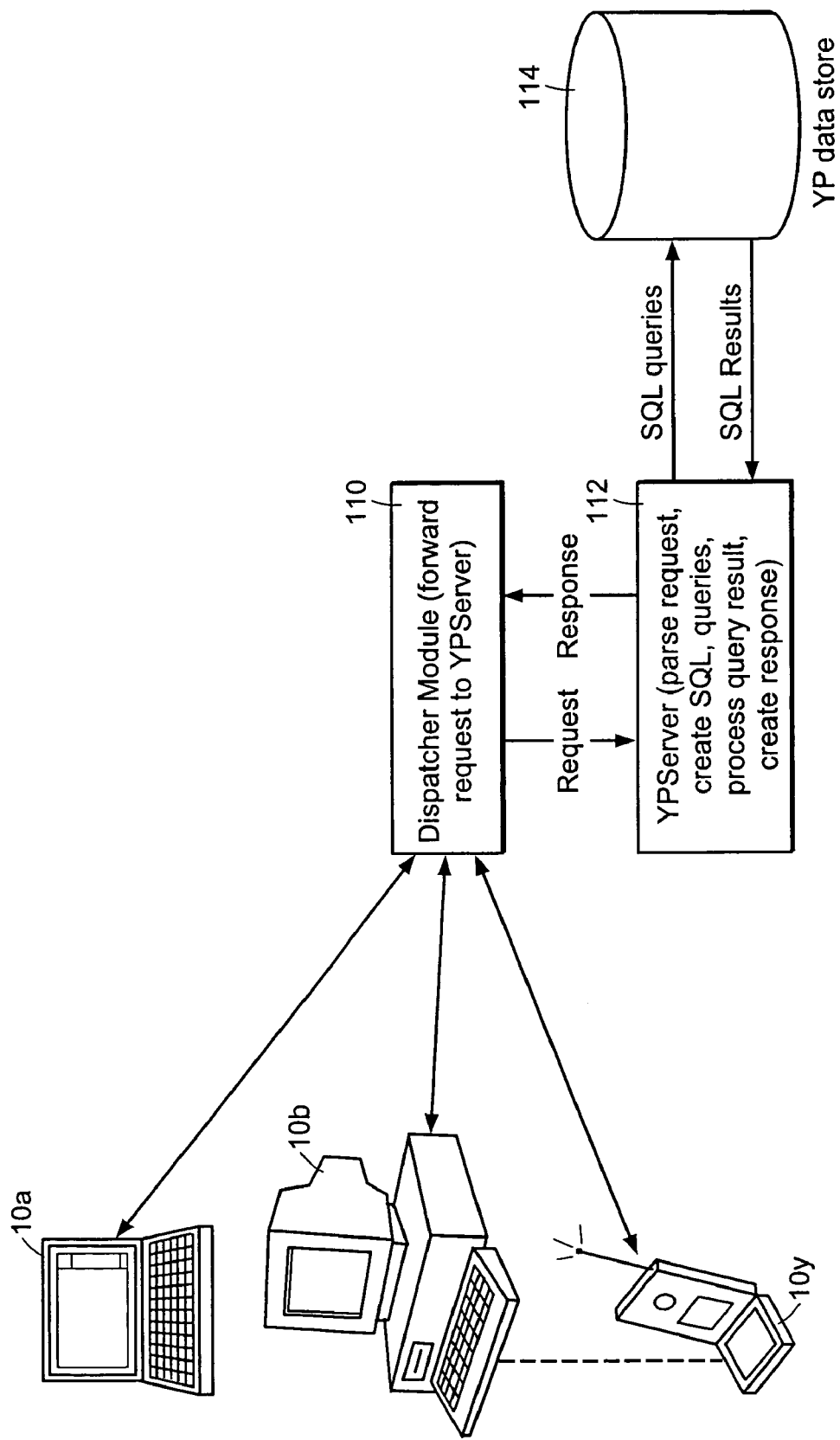
FIG. 2 is a schematic diagram illustrating processing of a request.

The operation of the system 100 is described in further detail in FIG. 2. The clients 10a–x send requests do the dispatcher module 110, which forwards those requests to the business directory server 112. The business directory server parses the request and creates database queries. In response to a database query sent by the business directory server 112, the database server 114 returns appropriate database results. The business directory server 112 then formats the received results and forwards them back to the dispatcher module 110, which, in turn, communicates with the requesting client. In a particular embodiment of the invention, the business directory server 112 communicates with the database server 114 using SQL queries. In an alternative embodiment of the invention, server/database communications can be implemented in any appropriate way, as determined by one skilled in the art. The database server 114 can include additional servers or multiple databases, all referred herein to as a single database.

The dispatcher module 110 and the business directory server 112 can be separate programs running on different computers, or they can be located on a single computer, with only logical separation in their function. In addition, the database 114 can also be located on the same physical hardware, or, alternatively, be spread out over several physical servers.

Figure 3:
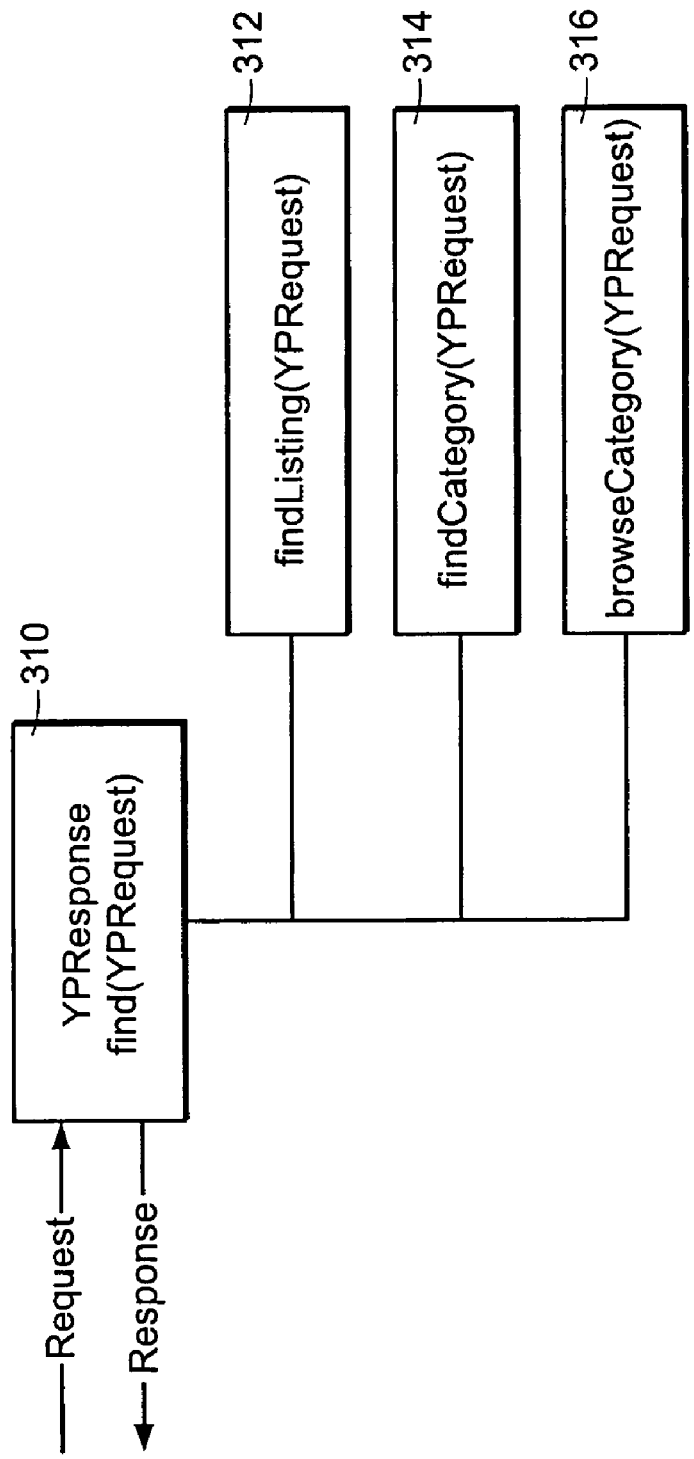
FIG. 3 is a schematic diagram of the business services server.

Operation of the business directory server 112 is further described in connection with FIG. 3. The business directory server module 112 consists of two subroutines: an initialization subroutine (not shown) and a find subroutine 310. Initialization subroutine is used to load data vendor information from the database 114 during the initialization time. Loading the database vendor information ensures that the business directory server 112 can issue SQL queries to the right tables by looking up in memory the appropriate vendor information tables.

After initialization, the business directory server 112 is ready to process the client requests. When the system 100 receives a business directory request, it forwards it to the business directory server 112. A request is received at the find subroutine 310. In one embodiment of the invention, the business response module is implemented in Java, although a different programming language can be used, as determined by one skilled in the art. The business directory server 112 runs on a web application server (for example, Oracle 9i Internet Application Server). The dispatcher module 110 runs as a separate servlet (for example, as a J2EE component) and receives all the requests. In an alternative embodiment of the invention, both the business directory server 112 and the dispatcher module 110 can be implemented as separated servers running on separate hardware.

The business directory find subroutine 310 determines whether a particular request is for looking up a listing by business name, or looking by category name, or by browsing by category hierarchy. It then passes the request on to the proper function, such as a find listing function 312, a find category function 314, or a browse category function 316, respectively. In an alternative embodiment of the invention, additional find or browsing capabilities may be provided, such that the user can, for example, browse individual listings or be able to select from different data vendors. Once the results are returned from the database 114, the find subroutine 310 sends results to the dispatcher module 110 to be returned to the client 10.

Figure 4:
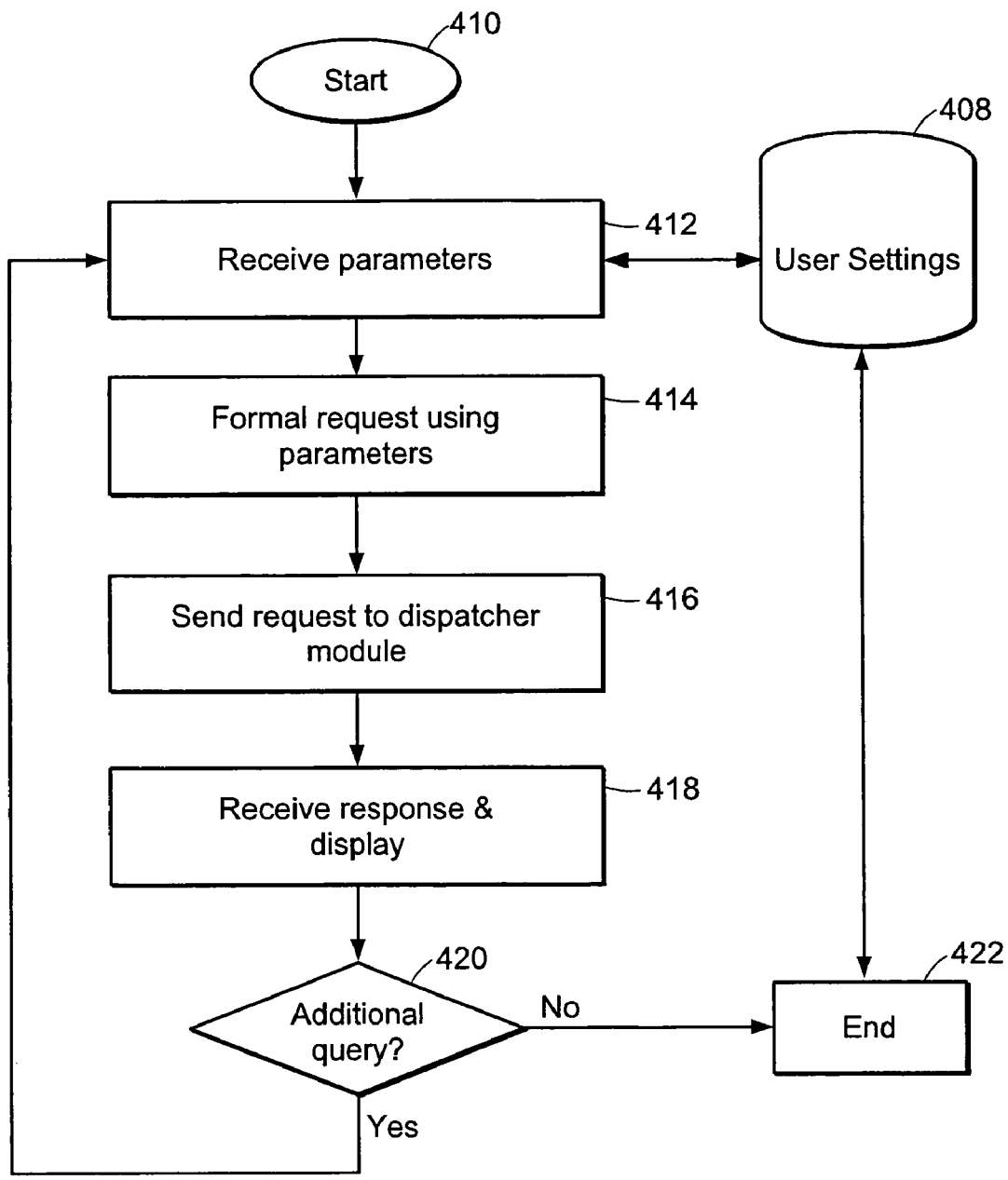
FIG. 4 is a flow chart illustrating operation of the business directory services request client.

The clients 10*a*–*x* can be implemented using software appropriate for the particular client type. For example, client software for the client 10*x*, a cellular phone, can be implemented to have minimum display requirements and be able to fit as much information on a small display, as possible. Regardless of the type of client used, client software on all clients can take similar steps in sending and receiving requests. Operation of client software modules is generally illustrated in FIG. 4.

After initializing the business directory request module in the step 410, the user can enter request parameters in the step 412. These request parameters can include, for example, business location, business category, or any other search parameters. In an alternative embodiment of the invention, initial request parameters can be retrieved from a user settings store 408, such that the user does not have to define initial parameters. This can be used for, for example, initiating a query from a particular geographic location or limit to this location. In addition, the user settings 408 can contain the parameters of the last search performed by this client.

In another embodiment of the invention, some of the initial search parameters can be supplied from external modules—for example, in a client equipped with GPS capabilities, the initial search parameters can automatically include location within a certain distance from the present location of the client. In yet another embodiment of the invention, similar location capabilities of the cellular phones may be used to supply geographic restrictions for initial search parameters. Obtaining geocode parameters is described, for example, in U.S. patent application Ser. No. 10/165,811, filed on Jun. 7, 2002, the entire teachings of which are incorporated herein by reference.

After the search parameters are received in step 412, the client formats the proper request using those parameters in step 414. The request is sent to the dispatcher module 110 in step 416. The client then awaits receipt of the response from the dispatcher module 112. Received results are displayed in step 418. Based on the results received from the initial query, the user may decide to drill down in to the categories or to add additional search parameters. If the decision to drill down is made in step 420, the module returns to the step 412 where new parameters now include those that the user chooses to enter in addition to the original query. The client module can proceed in such iterations until the user receives the desired results.

A context object is used within the client to store information about the current query—when the user enters the search parameters for drilling down, they are added to the context object. In such a way, additional information is maintained from one query to another, and the user does not need to re-enter all the original parameters. Information from the context object can then be sent to the business directory service 100 in order to obtain appropriate results.

In a particular embodiment of the invention, all the query parameters get sent from the clients 10*a*–*x* to system 100 in all queries. In an alternative embodiment of the invention, some customization or cashing can be done within system 100. For example, business directory server 112 can store information about previous queries from particular clients. In this case, the client 10 would need to only supply additional search parameters, without having to send all the query parameters. For example, if the user is searching for a Mercedes-Benz dealership, the request can include only indication of narrowed up categories while the business directory server 112 will store the general categories in which the search will be performed. In yet another embodiment of the invention, the parameters can be cashed or stored within the dispatcher module 112, or even within the database 116.

Information from the context object is transmitted to and from the business directory service 100 using data packets. In a particular embodiment of the invention, the format of the data packets is that of XML packets. Illustrated in FIGS. 5*a*–*c* are sample XML definitions, which can be used to transfer responses and requests. Using XML allows for easy storing of context object information and translation of information for displaying in whichever format appropriate for the particular client.

Three query types can be provided: listing looking, category look up, and category browsing. Query type is specified by the "type" attribute 512 of <request> node 510. The query conditions of the three query types are specified in corresponding node, <listing_lookup> 514, <category_lookup>, and <category_browse> (not shown). The "result_type" attribute 516 allows users to specify how detailed listing results should be. Three results types are defined: Basic, Detail1 and Detail2. The "number_to_return" attribute 518 can be used to limit the maximum number of listing records to be returned.

A search condition can be combination of the following query criteria: listing name, category name/code and search region. A <listing_name> node can be used to search for listings whose names satisfy requirements such as being equal to, containing, starting with or containing keyword sound like some given keyword. The following example is used to search for listings with name starting with "iron gate":

<listing_name search_string="iron gate" search_mode="start_with"/>

A <category> node can be used to search for listings in some specific categories, whose category codes are in the given list or whose names satisfy such requirement as being equal to, containing, starting with, ending with, or sounding like some given string. Either category code or category name can be used to search for categories.

A <search_region> node can be used to search for listings within some geographic region, which is specified by administration area, such as city, state and postal code, or by distance from some given location.

In addition to looking up objects, users can browse categories using <category_browse> node. Altogether, there is a wide range of possibilities for types and kinds of searching presented in a general XML schema. The input document schema of a particular embodiment is shown in FIG. 5*b*.

Results returned from the database are formatted by the business directory server 112 in a pre-defined output XML schema (FIG. 5*c*). For a listing lookup query, the business directory server 112 returns a list of matched listing, along with the list of categories that the listing belongs to. For a category lookup query, the business directory server 112 returns a list of matched categories, and for a category browsing query, a listing of the requested category hierarchy is returned.

In an alternative embodiment of the invention, different XML schemas may be used, as defined by one skilled in the art. In yet another embodiment of the invention, a context object may be passed from the clients to the business directory service 100 in an object state, without converting it to XML definitions. In yet another embodiment of the invention, cashing and storing of the information may be used, such that only additional components of the new queries may need to be transferred.

As discussed above, data from multiple vendors may be used to provide business directory services. The database 114 can contain a wide range of data formats and types. Illustrated in FIGS. 6a–6c are database schema for the business directory service according to one embodiment of the invention. There are three types of tables in the database schema: vendor profile table (FIG. 6a), category table (FIG. 6b), and business listing table (FIG. 6c). Vendor profile table stores the data vendor dependent information. Category tables store the category hierarchy information, while the business listing tables store the actual business directory listing information. There can be multiple category tables and listing tables for multiple data vendors. Typically, each data vendor will have one category table and one listing table to store its own category and business listing information.

The vendor profile table (FIG. 6a) describes how the actual category and listing data are stored for different vendors. Each row contains information about the category and listing table names for a data vendor and the country to which the data belongs. If a vendor providers data for multiple countries, it can have multiple rows in this table. Thus if INFOUSA is the data supplier for U.S. business directory information, then in the vendor table there will be an entry with the following values: ["INFOUSA", "US", "CATEGORY_INFOUSA", "LISTING_INFOUSA"].

The listing table stores information of the business listings. Table structure for different data suppliers can be different, and illustrated in FIG. 6b is one way of structuring table columns. The category table (FIG. 6c) stores category names, SIC codes (or codes for any other nomenclature), and the category hierarchy. In an alternative embodiment of the invention, different database schema can be used. In yet another embodiment of the invention, data from different vendors can be filtered and combined into one coherent set of tables.

Figure 7:
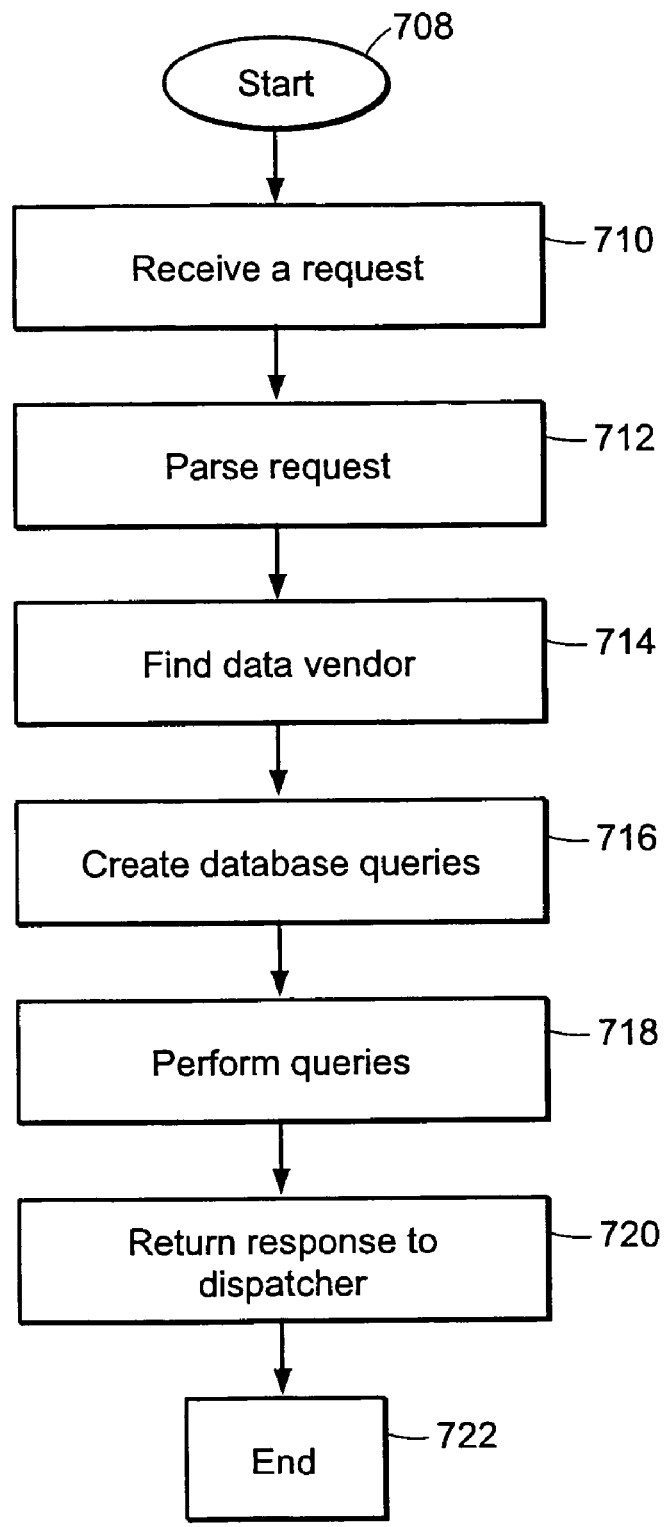
FIG. 7 is a flow chart illustrating operation of the business directory server module.

Referring now to FIG. 7, illustrated there is a flow chart illustrating operation of the business directory server module 112. As discussed above, the business directory server module receives client requests (step 710), parses them from the XML format (step 712), finds proper data vendors for the request (step 714), creates an appropriate SQL database query (step 716), which is sent to the database 114 in step 718. After results are returned from the database 114, business directory server module 112 formats the results and returns them to dispatcher module 110 (step 720). The business directory server module can be threaded, such that a separate thread is spawned for each request. In another embodiment of the invention, several business directory server modules can be available at once, listening on the communication ports for receiving the client requests.

Those of ordinary skill in the art should recognize that methods for the business directory service may be embodied in a computer program product that includes a computer usable medium. For example, such a computer usable medium can include a readable memory device, such as a solid state memory device, a hard drive device, a CD-ROM, a DVD-ROM, or a computer diskette, having stored computer-readable program code segments. The computer readable medium can also include a communications or transmission medium, such as a bus or a communications link, either optical, wired, or wireless, carrying program code segments as digital or analog data signals.

While the system has been particularly shown and described with references to particular embodiments, it will be understood by those of ordinary skill in the art that various changes in form and details may be made without departing from the scope of the invention encompassed by the appended claims. For example, the methods of the invention can be applied to various environments, and are not limited to the described environment.

What is claimed is:

1. A computer-implemented method for providing business directory services from a networked client, the method comprising:
receiving a search parameter from a user wherein the search parameter comprises a search type parameter, wherein the search type parameter can be at least one of the following: find a listing, browse listings, and browse a category, and wherein the search parameter comprises searching within a selected distance from a selected geographical object, wherein said search parameter is stored as a context object and wherein said context object is used within the client to store information about a current query and wherein when additional search parameters are entered by a user, said additional search parameters are added to said context object;
repeating, until a satisfactory level of granularity is reached;
sending the search parameter to a business directory server;
receiving, from the business directory server, results of the search responsive to the search parameter; and
receiving, from the user, an additional search parameter for searching within the search results.

2. The method of claim 1, further comprising displaying the search results to the user in such a way as to simplify selection of the additional search parameter.

3. The method of claim 2, wherein the client is at least one of: an email client, a web-based client, and a wireless device client.

4. The method of claim 3, wherein the wireless device client is a cellular phone.

5. The method of claim 1, wherein the search parameter is based at least in part on user preferences stored in the client.

6. The method of claim 5, wherein the user preferences comprise preferences for initial geographic location around which to base the search.

7. The method of claim 6, wherein the initial geographic location is determined based on a location of the client.

8. The method of claim 1, wherein the context object is encoded in an XML schema.

9. A networked client for providing business directory services, the client comprising:
a user interface for receiving a search parameter from a user, wherein the search parameter comprises a search type parameter, wherein the search type parameter can be at least one of the following: find a listing, browse listings, and browse a category, and wherein the search parameter comprises searching within a selected distance from a selected geographical object, wherein said search parameter is stored as a context object and wherein said context object is used within the client to store information about a current query and wherein when additional search parameters are entered by a user, said additional search parameters are added to said context object;

an encoding module for encoding the search parameter in a context object;

a communications module for transferring the search parameter to a business directory server;

a user interface for displaying search results received from the business directory server; and a user interface for receiving a second search parameter from a user for a search within the search results received from the business directory server.

10. The networked client of claim 9, wherein the search parameter further comprises a combination of search types.

11. The networked client of claim 9, wherein the client is at least one of the following: an email client, a web-based client, and a wireless device client.

12. A computer program product for providing business directory services to a user, comprising:

a computer readable medium;

instructions recorded on the computer readable medium, including instructions for:

receiving a search parameter from a user wherein the search parameter comprises a search type parameter, wherein the search type parameter can be at least one of the following: find a listing, browse listings, and browse a category, and wherein the search parameter comprises searching within a selected distance from a selected geographical object, wherein said search parameter is stored as a context object and wherein said context object is used within the client to store information about a current query and wherein when additional search parameters are entered by a user, said additional search parameters are added to said context object; and repeating, until a satisfactory level of granularity is reached:

sending the search parameter to a business directory server, receiving, from the business directory server, results of the search responsive to the search parameter, and receiving, from the user, an additional search parameter for searching within the search results.

13. The computer program product of claim 12, wherein the instructions recorded on the computer readable medium further comprise instructions for displaying the search results to the user in such a way as to simplify selection of the additional search parameter.

14. The computer program product of claim 12, wherein the computer-readable medium is enclosed in a wireless communications device.

15. The computer program product of claim 12, wherein the search parameter is based at least in part on user preferences stored in the client.

16. A networked client for providing business directory services, the client comprising:

means of receiving a search parameter from a user, wherein the search parameter comprises a search type parameter, wherein the search type parameter can be at least one of the following: find a listing, browse listings, and browse a category, and wherein the search parameter comprises searching within a selected distance from a selected geographical object, wherein said search parameter is stored as a context object and wherein said context object is used within the client to store information about a current query and wherein when additional search parameters are entered by a user, said additional search parameters are added to said context object; and means for repeating, until a satisfactory level of granularity is reached, operations by:

means for sending the search parameter to a business directory server, means for receiving, from the business directory server, results of he search responsive to the search parameter, and means for receiving, from the user, an additional search parameter for searching within the search results.

17. The networked client of claim 16, wherein the client is embodied in a wireless device.

18. A computer-implemented method for providing business directory services, the method comprising:

receiving, by a dispatcher module, a search request containing a context object including at least one search parameter, wherein the search parameter comprises a search type parameter, wherein the search type parameter can be at least one of the following: find a listing, browse listings, and browse a category, and wherein the search parameter comprises searching within a selected distance from a selected geographical object, wherein said context object is used within the client to store information about a current query and wherein when additional search parameters are entered by a user, said additional search parameters are added to said context object;

transferring the search request from the dispatcher module to a business directory server module;

searching a database responsive to the at least one search parameter encoded in the context object; and encoding results of the database search in a second context object.

19. The computer-implemented method of claim 18, wherein the context object is encoded in an XML schema.

20. The computer-implemented method of claim 19, wherein the second context object is encoded in the XML schema.

21. The computer-implemented method of claim 19, wherein the database contains data from at least two vendors.

22. The computer-implemented method of claim 21, further comprising selecting an appropriate data vendor based on the search parameter.

23. The computer-implemented method of claim 21, wherein the data from the at least two vendors are integrated into one database schema.

24. A system for providing business directory services, the system comprising:

means for receiving, by a dispatcher module, a search request containing a context object including at least one search parameter, wherein the search parameter comprises a search type parameter, wherein the search type parameter can be at least one of the following: find a listing, browse listings, and browse a category, and wherein the search parameter comprises searching within a selected distance from a selected geographical object, wherein said context object is used within the client to store information about a current query and wherein when additional search parameters are entered by a user, said additional search parameters are added to said context object;

means for transferring the search request from the dispatcher module to a business directory server module;

means for searching a database responsive to at least one search parameter encoded in the context object; and means for encoding results of the database search in a second context object.

25. The system of claim 24, wherein the means for encoding results of the database search in a second context object further comprise means for encoding the second context object in an XML schema.

26. A computer program product for providing business directory services, comprising:
- a computer readable medium;
- instructions recorded on the computer readable medium, including instructions for:
    - receiving, by a dispatcher module, a search request containing a context object including at least one search parameter, wherein the search parameter comprises a search type parameter, wherein the search type parameter can be at least one of the following: find a listing, browse listings, and browse a category, and wherein the search parameter comprises searching within a selected distance from a selected geographical object, wherein said context object is used within the client to store information about a current query and wherein when additional search parameters are entered by a user, said additional search parameters are added to said context object;
    - transferring the search request from the dispatcher module to a business directory server module;
    - searching a database responsive to at least one search parameter encoded in the context object; and
    - encoding results of the database search in a second context object.

27. The computer program product of claim 26, wherein the instructions recorded on the computer readable medium further comprise instructions for encoding the second context object in an XML schema.

* * * * *